(12) United States Patent

Hilem

(10) Patent No.: US 8,737,820 B2
(45) Date of Patent: May 27, 2014

(54) SYSTEMS AND METHODS FOR RECORDING CONTENT WITHIN DIGITAL VIDEO

(75) Inventor: Nick Hilem, Philadelphia, PA (US)

(73) Assignee: Snapone, Inc., Princeton, NJ (US)

( * ) Notice: Subject to any disclaimer, the term of this patent is extended or adjusted under 35 U.S.C. 154(b) by 80 days.

(21) Appl. No.: 13/162,807

(22) Filed: Jun. 17, 2011

(65) Prior Publication Data

US 2012/0321281 A1    Dec. 20, 2012

(51) Int. Cl.
*H04N 5/783* (2006.01)
*H04N 21/433* (2011.01)

(52) U.S. Cl.
CPC .................................. *H04N 21/433* (2013.01)
USPC .......................................... 386/343; 386/349

(58) Field of Classification Search
CPC .......................... H04N 21/433; H04N 21/6587
See application file for complete search history.

(56) References Cited

U.S. PATENT DOCUMENTS

| | | | |
|---|---|---|---|
| 5,524,193 A | 6/1996 | Covington et al. |
| 5,600,775 A | 2/1997 | King et al. |
| 5,717,468 A | 2/1998 | Baryla |
| 5,966,121 A | 10/1999 | Hubbell et al. |
| 6,058,239 A | 5/2000 | Doyle |
| 6,112,226 A | 8/2000 | Weaver et al. |
| 6,546,405 B2 | 4/2003 | Gupta et al. |
| 7,624,337 B2 | 11/2009 | Sull et al. |
| 7,738,740 B2 | 6/2010 | Ruggiero |
| 7,739,597 B2 | 6/2010 | Wong et al. |
| 2002/0089519 A1 | 7/2002 | Betz et al. |
| 2002/0188630 A1 | 12/2002 | Davis |
| 2002/0199189 A1 | 12/2002 | Prijatel et al. |
| 2003/0234806 A1 | 12/2003 | Toyama et al. |
| 2004/0181545 A1 | 9/2004 | Deng et al. |
| 2004/0201609 A1 | 10/2004 | Obrador |
| 2004/0237032 A1 | 11/2004 | Miele et al. |
| 2004/0240562 A1 | 12/2004 | Bargeron et al. |
| 2005/0033758 A1 | 2/2005 | Baxter |
| 2005/0097451 A1 | 5/2005 | Cormack et al. |
| 2005/0114325 A1 | 5/2005 | Liu et al. |
| 2005/0144164 A1 | 6/2005 | Gorak et al. |
| 2007/0180488 A1 | 8/2007 | Walter et al. |
| 2007/0208776 A1 | 9/2007 | Perry et al. |
| 2007/0256016 A1 | 11/2007 | Bedingfield, Sr. |

(Continued)

FOREIGN PATENT DOCUMENTS

| | | |
|---|---|---|
| EP | 1 487 213 | 6/2007 |
| WO | WO 97/04596 | 2/1997 |

(Continued)

*Primary Examiner* — William C Vaughn, Jr.
*Assistant Examiner* — Asher Khan
(74) *Attorney, Agent, or Firm* — Maegher Emanuel Laks Goldberg & Liao, LLP (57) ABSTRACT

A method for recording user content within a digital video is provided. The method may display a visual timeline associated with the digital video at a user interface, reserve one or more frames of the digital video for insertion of the user content, temporally indicate the reserved frames on the visual timeline using one or more visual tags, retrievably store the user content at a storage device, associate the user content to the reserved frames of the digital video, and enable the user content to be played back in parallel with the digital video at the reserved frames. The user content may include any one or more of text data, audio data, image data and video data. The reserved frames may be selected based on input provided by a user through the user interface.

20 Claims, 5 Drawing Sheets

(56) References Cited

U.S. PATENT DOCUMENTS

| | | |
|---|---|---|
| 2007/0294295 A1 | 12/2007 | Finkelstein et al. |
| 2008/0046925 A1* | 2/2008 | Lee et al. .................. 725/37 |
| 2008/0091723 A1 | 4/2008 | Zuckerberg et al. |
| 2008/0184121 A1 | 7/2008 | Kulas |
| 2009/0092374 A1 | 4/2009 | Kulas |
| 2009/0094520 A1 | 4/2009 | Kulas |
| 2009/0097815 A1 | 4/2009 | Lahr et al. |
| 2009/0100068 A1 | 4/2009 | Gauba et al. |
| 2009/0106703 A1 | 4/2009 | Park et al. |
| 2009/0150406 A1 | 6/2009 | Giblin |
| 2009/0327856 A1 | 12/2009 | Mouilleseaux et al. |
| 2010/0083173 A1 | 4/2010 | Germann et al. |
| 2010/0122306 A1 | 5/2010 | Pratt et al. |
| 2010/0172635 A1 | 7/2010 | Harris |

FOREIGN PATENT DOCUMENTS

| | | |
|---|---|---|
| WO | WO 99/46702 | 9/1999 |
| WO | WO 00/28736 | 5/2000 |
| WO | WO 2004/006574 | 1/2004 |
| WO | WO 2004/090898 | 10/2004 |
| WO | WO 2004/090899 | 10/2004 |
| WO | WO 2004/090900 | 10/2004 |
| WO | WO 2007/115224 | 10/2007 |
| WO | WO 2007/132395 | 11/2007 |
| WO | WO 2008/157628 | 12/2008 |
| WO | WO 2009/073858 | 6/2009 |
| WO | WO 2009/148756 | 12/2009 |
| WO | WO 2010/000074 | 1/2010 |

* cited by examiner

SYSTEMS AND METHODS FOR RECORDING CONTENT WITHIN DIGITAL VIDEO

TECHNICAL FIELD

The present disclosure generally relates to digital video commenting, and more particularly, to systems and method for recording content within a digital video.

BACKGROUND

Social networking websites for sharing digital videos are common and well known in the art. These websites enable users to upload user-generated or user-recorded digital videos to a server and/or database of the network and share their digital videos with other users on the network to view the digital video. Moreover, digital videos previously uploaded to the network and stored on the network database can be retrieved and locally played back by a plurality of other users on the network. Some such websites may also enable the users to comment on a digital video by allowing them to submit opinions or remarks on a webpage display that contains and/or is linked with the digital video. Comments on a particular digital video may be collectively associated with the digital video and made available for viewing during subsequent playback sessions thereof.

These social networks may enable users to submit and share comments on digital videos, there are still some limitations. At best, the comments submitted by users are associated with the digital video as a whole and are not associated with any particular moment of the digital video. As a result, users wishing to insert a comment typically must specify the particular moment in the digital video that the comment is in reference to. Furthermore, users subsequently viewing the digital video and reading previously submitted comments are often left to guess what moment in the digital video a particular comment is directed to. Additionally, currently existing social networks do not enable users to submit comments in any form other than text data. More particularly, users viewing a digital video and wanting to comment on the digital video are unable to comment on the digital video using audio, video, or any form of data other than simple text.

Baryla, U.S. Pat. No. 5,717,468, discloses a system which enables the recording and displaying of comments associated with a video. However, Baryla is more directed toward video editing and production rather than recording content within socially or publicly shared digital video. Baryla is also solely limited to text comments, and further, requires the video to be paused in order to record a text comment. The system disclosed by Baryla is thus unable to reserve selected video frames to be associated with a comment and dynamically record comments during video playback. Furthermore, Baryla is unable to dynamically display the comments previously recorded without pausing the video.

Walter, et al., U.S. Patent Application No. 2007/0180488, disclose a system for processing video content or tags within a video stream. More specifically, the system disclosed by Walter, et al. is capable of accessing tags carried by a video stream and process a time stamp associated with the tag. Based on the tag and an associated time stamp, the system is able to execute a script that is associated with the tag. However, Walter, et al. is directed more towards set-top boxes or units which process streaming video data to be presented on television screens. More particularly, the tags disclosed by Walter, et al. are limited to performing tag actions associated with parental control features rather than providing means for commenting on shared media.

Prijatel, et al., U.S. Patent Application No. 2002/0199189, disclose a system for inserting supplemental video and audio content into a transmission stream. In particular, Prijatel, et al. discloses analyzing the appropriate time considerations of a transmission, and further, inserting tags into the transmission stream based on the analysis. The tags inserted by Prijatel, et al. are disclosed to include promotional or advertising content. However, the system disclosed by Prijatel, et al. is limited to simple insertion of the tags and is not associated with particular frames of the existing video content. The system disclosed is thus unable to, for instance, concurrently playback the inserted content during playback of the original video transmission.

Accordingly, there is a need to enable users to insert and record user-generated comments into digital videos by associating the comments with not only the digital video but with specific moments of the digital video. There is also a need to enable users to comment on a digital video not only using text data but with any other medium, such as audio and/or video data. The disclosed systems and methods are directed at addressing one or more of the needs set forth above.

SUMMARY OF THE DISCLOSURE

In one aspect of the present disclosure, a method for recording user content within a digital video is provided. The method displays a visual timeline associated with the digital video at a user interface, reserves one or more frames of the digital video for insertion of the user content, temporally indicates the reserved frames on the visual timeline using one or more visual tags, retrievably stores the user content at a storage device, associates the user content to the reserved frames of the digital video, and enables the user content to be played back in parallel with the digital video at the reserved frames. The reserved frames are selected based on input provided by a user through the user interface.

In another aspect of the disclosure, a system for recording user content within a digital video is provided. The system includes a storage device configured to retrievably store the digital video and the user content, and a primary network device in communication with the storage device. The primary network device includes at least one processor configured to generate a visual timeline associated with the digital video, reserve one or more frames of the digital video for insertion of the user content, temporally indicate the reserved frames on the visual timeline using one or more visual tags, associate the user content to the reserved frames of the digital video, and enable the user content to be played back in parallel with the digital video at the reserved frames.

In yet another aspect of the disclosure, a system for recording user content within a digital video over a social network is provided. The system includes a database configured to retrievably store the digital video and the user content, a plurality of client devices each having a user interface and being in communication with the database through the network, and at least one server device in communication with each of the database and the client devices. The server device includes at least one processor configured to generate a visual timeline associated with the digital video, reserve one or more frames of the digital video for insertion of the user content in response to user input received from the user interface of one or more of the client devices, temporally indicate the reserved frames on the visual timeline using one or more visual tags, retrievably store the user content at the database, associate the user content to the reserved frames of the digital video, and enable the user content to be played back in parallel with the digital video at the reserved frames.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
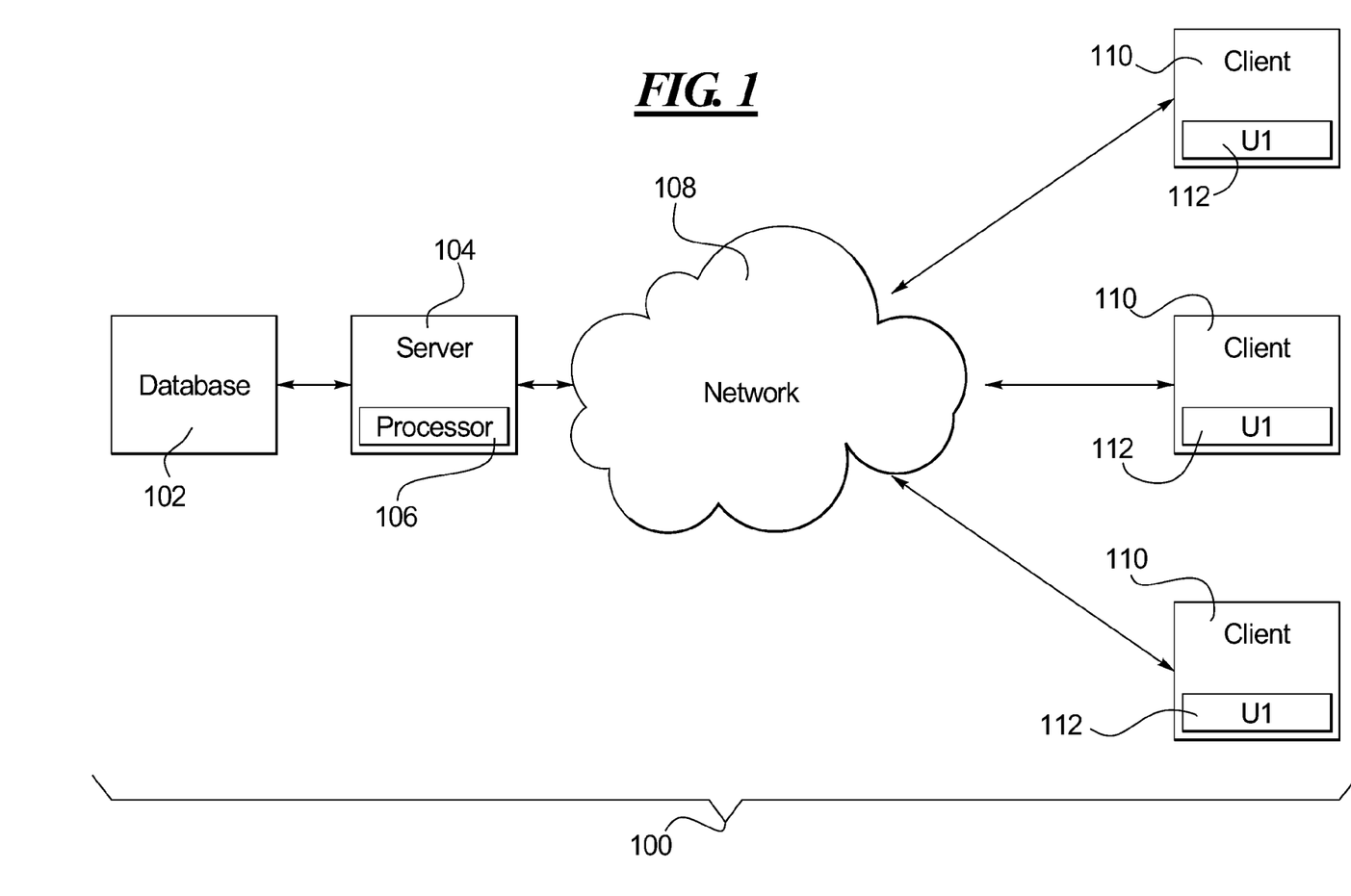
FIG. 1 is a schematic view of an exemplary content recording system as constructed in accordance with the teachings of the present disclosure.

Referring now to FIG. 1, an exemplary system 100 for recording user content within a digital video is provided. As shown, the content recording system 100 may generally include at least a storage device 102 which may include a database or any other form of memory suitable for retrievably storing data pertaining to one or more digital videos. The content recording system 100 may further provide a primary network device 104 which may include one or more servers or other suitable computational devices with processors 106 that are configured to manage the storage and retrieval of digital video data to and from the database 102. More specifically, the server 104 of FIG. 1 may be configured to selectively provide one or more users with access to the digital video database 102 over a network 108. The network 108 may be configured as a wide area network (WAN), such as the Internet, a local area network (LAN), or any other shared network that enables wired and/or wireless communications between the server 104 and one or more secondary network devices or clients 110. Each of the client devices 110 of FIG. 1 may include a personal computer, a mobile device, a handheld device, or any other computational device having a user interface 112 which enables user access to the network 108. The user interface 112 may include a combination of input and output interface devices, for example, display screens, touch screens, microphones, speakers, pointer devices, keyboards, and/or any other suitable means for enabling a user to locally input information to and output information from the associated client device 110.

Figure 2:
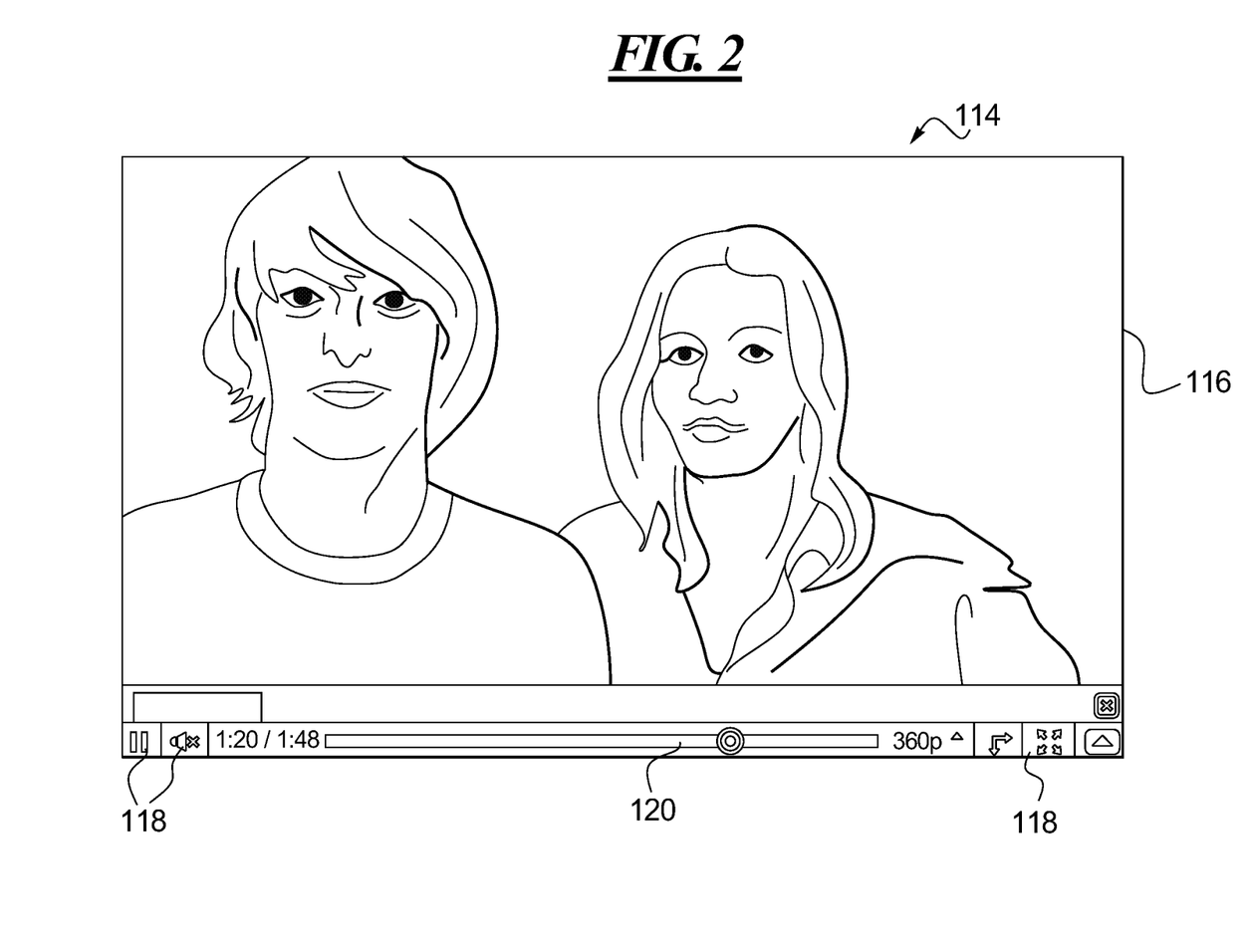
FIG. 2 is a diagrammatic view of an exemplary display for viewing a digital video.

Turning now to FIG. 2, one exemplary video display 114 for displaying a digital video 116 to one or more users at a user interface 112 of a client device 110 is provided. As shown, the display 114 may provide basic navigational controls 118 which enable a user to pause, stop or play the digital video 116, control playback volume, adjust display size, and the like. The display 114 may also provide a scrollbar or timeline 120 which enables a user to view the progress of the digital video 116 as it plays, and/or navigate or skip to a desired segment of the digital video 116. As discussed with respect to the content recording system 100 of FIG. 1, the digital video 116 of FIG. 2 may be retrieved from a digital video database 102 of a shared network 108. For instance, in applications wherein the network 108 is configured as a wide area network, the server 104 may host a social video-sharing website that may be accessed by a plurality of users from different client devices 110. By visiting the website using a web browser, or the like, a user may be able to select a digital video 116 and play the digital video 116 through, for example, the display 114 of FIG. 2, by streaming and/or locally storing the digital video 116 at the client device 110. Such a website may also enable a user to upload or submit additional videos and any associated metadata to the network 108 using the user interface 112 of the respective client device 110. New videos and associated metadata may then be retrievably stored onto the database 102 by a server 104 in communication with the network 108. Once stored, any user with access to the network 108 may be able to retrieve the new videos and associated metadata from the database 102 and play the videos on the video display 114 in a manner similar to that of the digital video 116 of FIG. 2.

Figure 3:
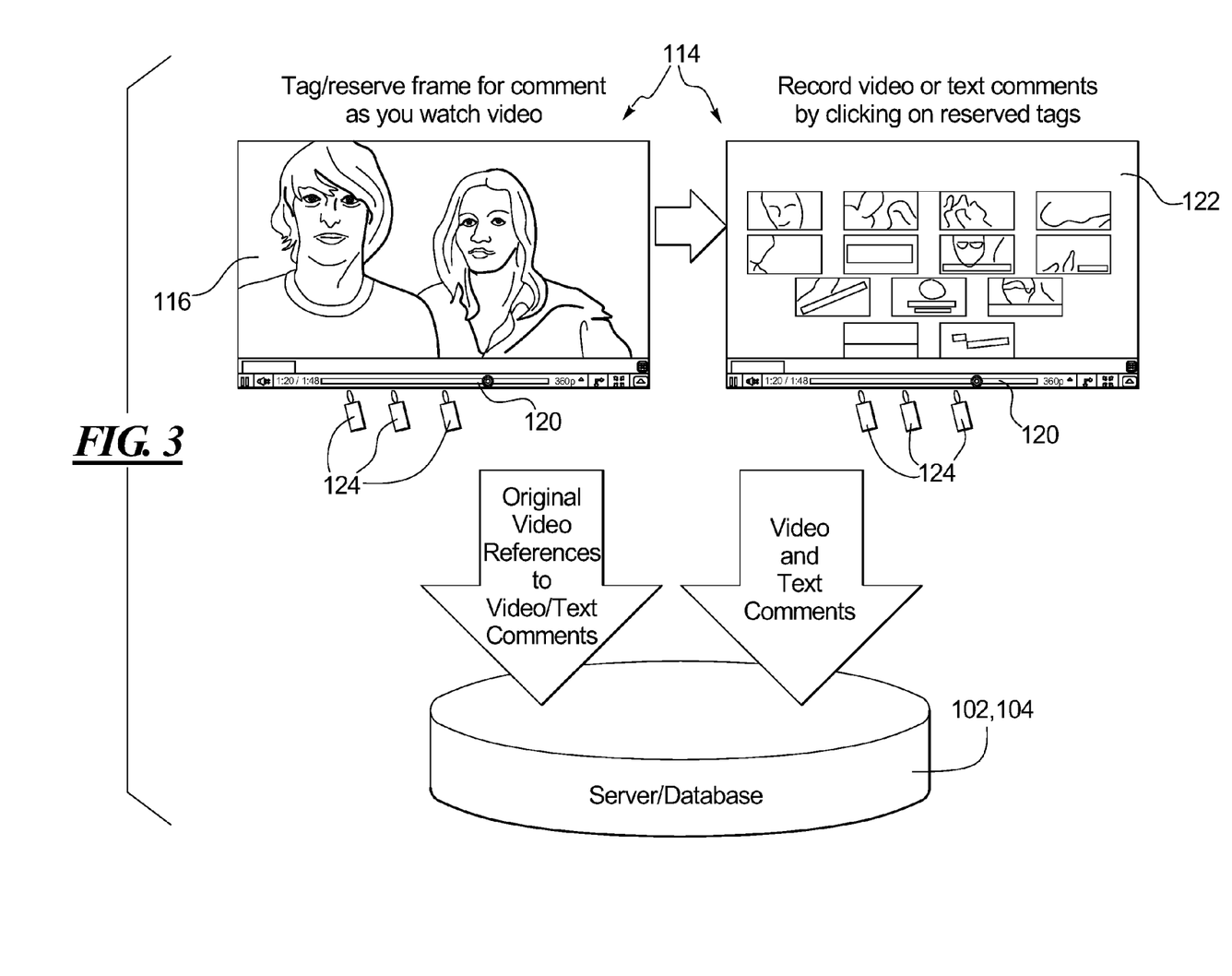
FIG. 3 is a schematic view of one exemplary session of recording user content within a digital video.

In conjunction with the embodiments disclosed herein, a user viewing a previously stored digital video 116 may be able to record and submit user content 122 to be associated with the digital video 116, as schematically shown for example in FIG. 3. User content 122 may generally include text data, audio data, image data, video data, and/or any other form of data that can be associated with an existing digital video 116 and shared with other users subsequently viewing the digital video 116 over a shared network 108. User content 122 may also include advertisements or promotional video clips that may be related to the content of the digital video 116. While viewing the digital video 116 of FIG. 3, a user may want to insert comments, or user content 122 in the form of text, audio and/or video data, into the digital video 116 such that those comments are viewable to users during subsequent playback sessions of the digital video 116. More specifically, a user may want to record user content 122 to be associated only with certain segments or frames within the digital video 116. Accordingly, the user may selectively reserve one or more frames of the digital video 116 for association with user content 122 using the timeline 120. The user may select the desired frames of the timeline 120 using a pointing device or any other input device through the user interface 112 of the respective client device 110. Furthermore, the temporal locations of the reserved frames may be indicated by visual tags 124, or the like. In the example session of FIG. 3, for example, each visual tag 124 may represent the first of a plurality of frames of the digital video 116 which are associated with some form of user content 122.

Still referring to the recording session of FIG. 3, the user may select any one or more of the visual tags 124 to begin recording user content 122 to be associated with the reserved frames. Moreover, each visual tag 124 may be selected by the user using a pointing device or similar input device through the user interface 112 of the respective client device 110. Once a visual tag 124 is selected, the user may be enabled to record text, audio, image and/or video data using the appropriate combination of input devices at the user interface 112 of the client device 110. For example, the user may record user content 122 in the form of text data using a keyboard or record user content 122 in the form of audio data using a microphone. The user may additionally or alternatively record user content 122 in the form of image or video data using a camera. Once complete, information pertaining to the original digital video 116 and the visual tags 124, or any other temporal reference of the user content 122 recorded at the client device 110, may be transmitted back to the server 104 and stored at the database 102. Additionally, information pertaining to the recorded user content 122 may also be transmitted to the server 104 and stored at the database 102 in association with the original digital video 116. In one refinement, any information pertaining to the user content 122 may be stored directly with any metadata associated with the original digital video 116. In a related refinement, a video proxy for the digital video 116 may be stored on the database 102 if the metadata associated with the digital video 116 cannot be modified, for example, because it is stored at a different location and only accessed via a reference. In such a case, any associated visual tags 124 or the temporal locations thereof may be stored in the video proxy.

Figure 4:
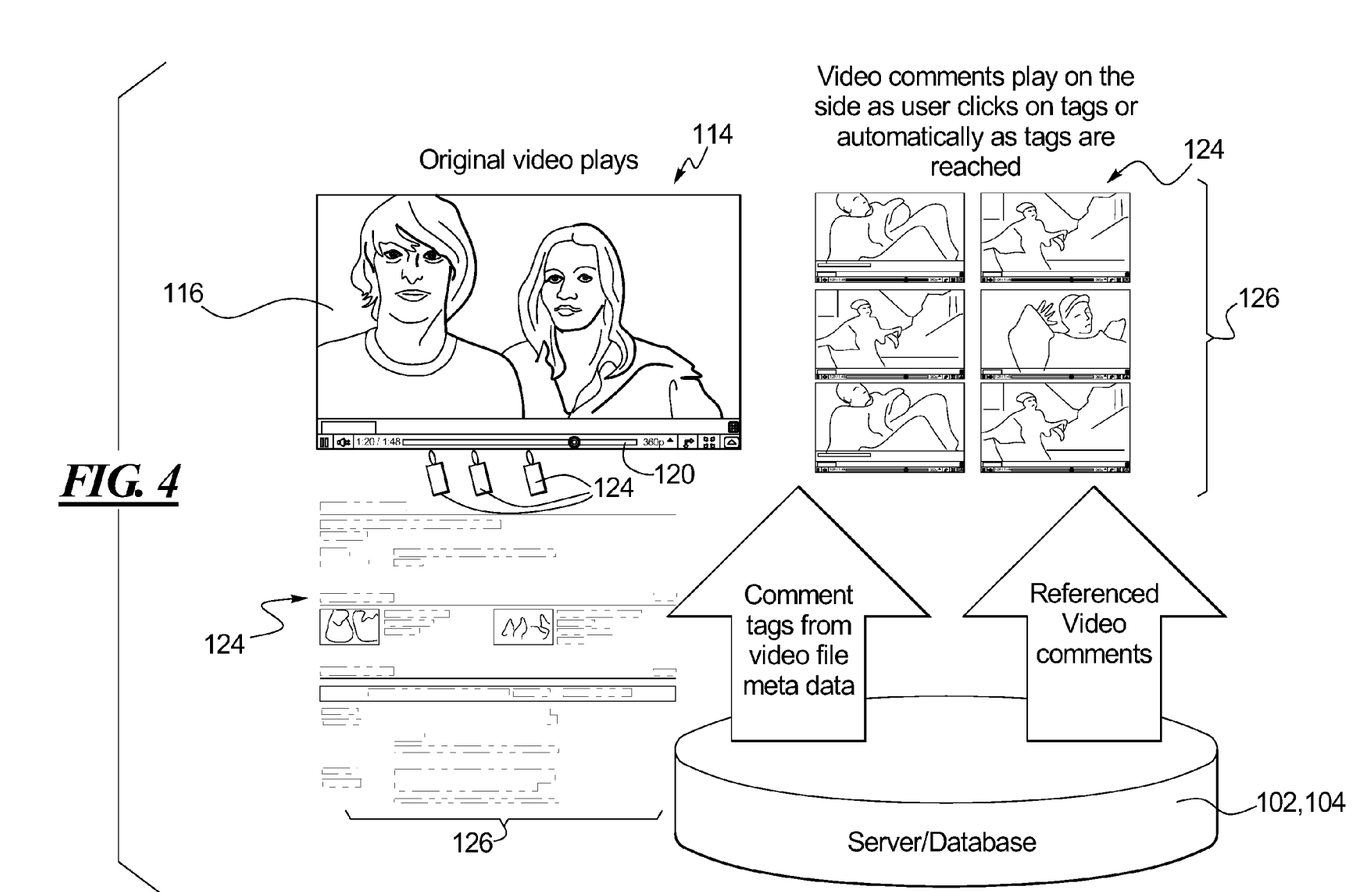
FIG. 4 is a schematic view of one exemplary session of playing back recorded user content with an associated digital video.

Once user content 122 has been successfully recorded within a digital video 116, playback of the user content 122 may be enabled during playback of the original digital video 116, as schematically shown for example in FIG. 4. More specifically, the original digital video 116 may be retrieved and played back by another user accessing the database 102 through the server 104 and the video hosting network 108. In addition to the original digital video 116, the video display 114 may further generate and display visual tags 124 on the timeline 120 representative of previously recorded user content 122. For example, each visual tag 124 may indicate the temporal location of the first of a plurality of previously reserved frames that have already been associated with user content 122. During playback of the digital video 116, previously recorded user content 122 may be displayed or automatically played back once the associated reserved frames of the digital video 116 are reached. For example, once the progress of the digital video 116 as indicated by the timeline 120 reaches the temporal locations marked by the visual tags 124, previously recorded text, audio, image and/or video comments may be simultaneously provided to the immediate user in additional viewing panes 126, or the like. In alternative modifications, previously recorded user content 122 may be played back sequentially. For example, once a visual tag 124 is reached on the timeline 120, the digital video 116 may be paused while previously recorded user content 124 associated with the visual tag 124 is played back. The digital video 116 may automatically resume once playback of the user content 124 is complete. In still further refinements, previously recorded user content 122 may be displayed in a smaller scale within the video display 114 using picture-in-picture technologies, or the like. Selectable thumbnails representative of previously recorded user content 122 may also be displayed to the immediate user so as to enable the user to preview user content 122 before playing back the user content 122. Furthermore, the visual tags 124 themselves may be selectable through the user interface 112 of the respective client device 110 regardless of the progress of the digital video 116. For instance, by clicking on a visual tag 124 using a pointing device, previously recorded user content 122 may be played back to the immediate user on demand.

Figure 5:
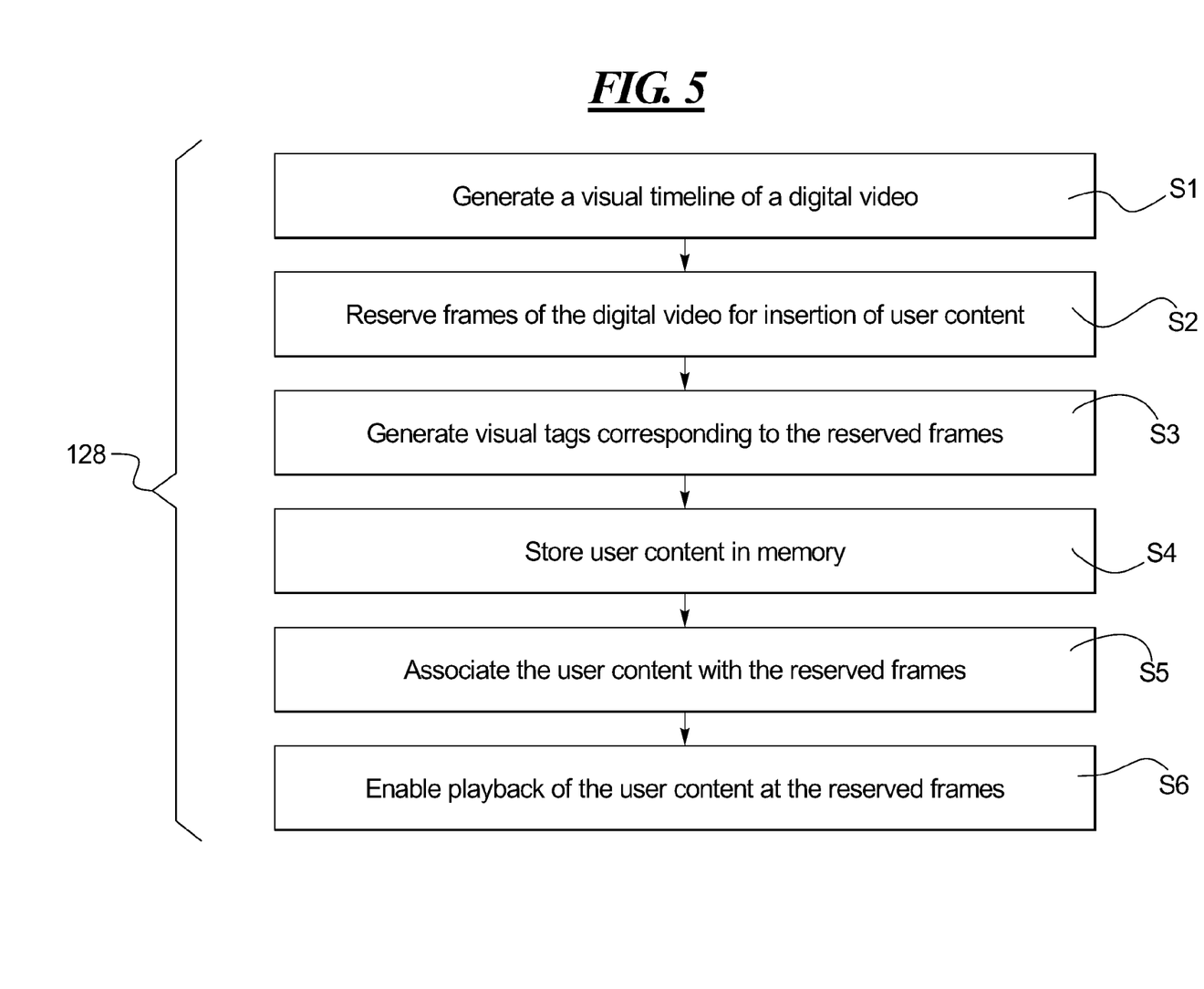
FIG. 5 is a flow diagram of an exemplary method of recording content within a digital video.

Turning now to FIG. 5, an exemplary method 128 or algorithm by which a processor 106 of a primary network device 104, such as a server, may enable the recording of user content 122 within a digital video 116 is provided. As an initial step S1, the processor 106 may be configured to generate a visual timeline 120 corresponding to the original digital video 116. Optionally, step S1 may be omitted in embodiments which provide a video display 114 already having a timeline 120. In step S2, the processor 106 may enable a user to select and reserve one or more frames of the digital video 116 using the timeline 120 for the insertion of user content 122. In step S3, the processor 106 may also generate and display one or more visual tags 124 in proximity of the visual timeline 120 so as to temporally indicate the one or more reserved frames associated therewith. Once frames of the original digital video 116 are reserved, the processor 106 may be configured to store user content 122 recorded by the user from a client device 110 into memory or storage device 102 in step S4. In step S5, the processor 106 may associate the user content 122 with the reserved frames of the original digital video 116, and further, store information pertaining to the association within the database 102. In step S6, the processor 106 may additionally be configured to enable playback of previously recorded user content 122 anytime during subsequent playback of the original digital video 116. More specifically, the processor 106 may enable the user content 122 to be sequentially and/or simultaneously played back with the associated digital video 116.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method for recording user content within a digital video, comprising the steps of:
    displaying a visual timeline associated with the digital video at a user interface during playback of the digital video;
    reserving one or more frames of the digital video for insertion of the user content, the reserved frames being selected based on input provided by a user through the user interface without pausing playback of the digital video;
    temporally indicating the reserved frames on the visual timeline using one or more visual tags;
    retrievably storing the user content at a storage device;
    associating the user content to the reserved frames of the digital video; and
    enabling the user content to be played back in parallel with the digital video at the reserved frames.

2. The method of claim 1, wherein the user content is generated by the user at the user interface.

3. The method of claim 1, wherein the storage device is accessible over a shared network to a plurality of users through a plurality of user interfaces.

4. The method of claim 1, wherein the user content provided by a plurality of users and user interfaces are enabled to be collectively received and played back with the associated digital video.

5. The method of claim 1, wherein the user content provided by different users are so indicated the visual timeline using the visual tags.

6. The method of claim 1, wherein user selection of one visual tag enables the user to add user content to the reserved frames corresponding to the selected visual tag.

7. The method of claim 1, wherein user selection of one visual tag enables individual playback of the user content associated with the reserved frames corresponding to the selected visual tag.

8. The method of claim 1, wherein the user content includes any one or more of text data, audio data, image data and video data.

9. A system for recording user content within a digital video, comprising:
    a storage device configured to retrievably store the digital video and the user content; and
    a primary network device in communication with the storage device, the primary network device having at least one processor configured to generate a visual timeline associated with the digital video during playback of the digital video, reserve one or more frames of the digital video for insertion of the user content without pausing playback of the digital video, temporally indicate the reserved frames on the visual timeline using one or more visual tags, associate the user content to the reserved frames of the digital video, and enable the user content to be played back in parallel with the digital video at the reserved frames.

10. The system of claim 9, wherein each of the visual timeline, the digital video, the visual tags and the user content is configured to be displayed at a user interface of at least one secondary network device.

11. The system of claim 9, wherein the reserved frames are selected by a user through a user interface of at least one secondary network device that is in communication with the primary network device.

12. The system of claim 9, wherein the user content is provided by a user through a user interface of at least one secondary network device that is in communication with the primary network device.

13. The system of claim 9, wherein the processor of the primary network device is configured to collectively receive and enable playback of user content provided by a plurality of users from a plurality of secondary network devices.

14. The system of claim 9, wherein the processor of the primary network device is configured to generate visual tags that distinguish user content provided by different users.

15. The system of claim 9, wherein user selection of one visual tag enables a user to add user content to the reserved frames corresponding to the selected visual tag, the user content being added through a user interface of a secondary network device.

16. The system of claim 9, wherein user selection of one visual tag enables individual playback of the user content associated with the reserved frames corresponding to the selected visual tag, the user content being played back at a user interface of a secondary network device.

17. The system of claim 9, wherein the user content includes one or more of text data, audio data, image data and video data.

18. A system for recording user content within a digital video over a social network, comprising:
- a database configured to retrievably store the digital video and the user content;
- a plurality of client devices each having a user interface and being in communication with the database through the network; and
- at least one server device in communication with each of the database and the client devices, the server device having at least one processor configured to generate a visual timeline associated with the digital video during playback of the digital video, reserve one or more frames of the digital video without pausing playback of the digital video for insertion of the user content in response to user input received from the user interface of one or more of the client devices, temporally indicate the reserved frames on the visual timeline using one or more visual tags, retrievably store the user content at the database, associate the user content to the reserved frames of the digital video, and enable the user content to be played back in parallel with the digital video at the reserved frames.

19. The system of claim 18, wherein the processor of the server device is enabled to collectively associate user content provided by different users with the digital video, the user content being provided through different user interfaces and client devices.

20. The system of claim 18, wherein each visual tag is selectable by the user from the user interface, the selection of the visual tag enables the user to add user content to the reserved frames corresponding to the visual tag and playback user content associated with the reserved frames corresponding to the visual tag.

* * * * *